(12) United States Patent
Lin et al.

(10) Patent No.: US 11,101,518 B2
(45) Date of Patent: Aug. 24, 2021

(54) MULTILAYER SHEET AND BATTERY

(71) Applicant: Ningde Amperex Technology Limited, Fujian (CN)

(72) Inventors: Sen Lin, Fujian (CN); Hua Wu, Fujian (CN); Yajie Zhang, Fujian (CN); Peipei Guo, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 106 days.

(21) Appl. No.: 16/238,514

(22) Filed: Jan. 2, 2019

(65) Prior Publication Data

US 2020/0136104 A1 Apr. 30, 2020

(30) Foreign Application Priority Data

Oct. 26, 2018 (CN) .......................... 201811259979.9

(51) Int. Cl.
*H01M 50/00* (2021.01)
*H01M 50/20* (2021.01)
*H01M 50/124* (2021.01)
*H01M 50/531* (2021.01)

(52) U.S. Cl.
CPC ......... *H01M 50/20* (2021.01); *H01M 50/124* (2021.01); *H01M 50/531* (2021.01)

(58) Field of Classification Search
CPC ..... H01M 2/0287; H01M 2/26; H01M 2/1016
See application file for complete search history.

(56) References Cited

U.S. PATENT DOCUMENTS

| 5,358,539 A * | 10/1994 | Dawson | H01M 2/0207 29/623.2 |
| 2009/0023046 A1 * | 1/2009 | Wang | H01M 4/8605 429/431 |
| 2013/0089769 A1 * | 4/2013 | Proctor | H01G 11/46 429/127 |
| 2015/0140400 A1 * | 5/2015 | Yamazaki | H01M 2/18 429/136 |
| 2017/0331156 A1 * | 11/2017 | Visco | H01M 10/0525 |
| 2020/0036067 A1 * | 1/2020 | Mummigatti | H01M 2/1077 |

* cited by examiner

*Primary Examiner* — Cynthia H Kelly
*Assistant Examiner* — Monique M Wills
(74) *Attorney, Agent, or Firm* — Morgan, Lewis & Bockius LLP

(57) ABSTRACT

In one aspect, the present application provides a multilayer sheet including a metal layer, a bonding layer arranged on a first surface of the metal layer, and a buffer layer arranged on a second surface of the metal layer, wherein the buffer layer is provided with a hole. The present application further provides a battery including an electrode assembly, and a packaging bag prepared from the multilayer sheet. Wherein the packaging bag packages the electrode assembly. It is an object of the present application to provide a multilayer sheet and battery capable of reducing vibration damage.

20 Claims, 3 Drawing Sheets

MULTILAYER SHEET AND BATTERY

CROSS-REFERENCE TO RELATED APPLICATIONS

The present application claims priority to Chinese Patent Application No. 201811259979.9, filed on Oct. 26, 2018, the content of which is incorporated herein by reference in its entirety.

FIELD

The present application relates to the technical field of battery, in particular, to a multilayer sheet and a battery.

BACKGROUND

In the terminal equipment, in order to solve the problem of the falling vibration of the electrode assembly, the battery is usually bond to the battery cavity of the terminal equipment to avoid the relative motion, such as sway, of the electrode assembly. As for the battery itself, it is impossible to prevent vibration currently. To prevent the damage of falling, the method of separator restricting is usually used by providing rubber material to wind around the head and tail of the cell so as to achieve the binding of the separator.

The method of bonding the battery to the battery cavity of the terminal equipment cannot eliminate the vibration of the electrode assembly caused by the impact process. The separator or the electrode sheet inside the electrode assembly may be damaged due to the vibration. Restricting the separator in the electrode assembly can only solve the influence of the impact of the battery on the separator caused by the falling of the terminal equipment, and there is still the risk of separator shrinkage. Therefore, at present, the methods mentioned above cannot solve the problem that the electrode assembly may be damaged when subjected to shock and vibration.

SUMMARY

To solve the problems in the prior art, it is an object of the present application to provide a multilayer sheet and battery capable of reducing vibration damage.

To achieve the above objective, in one aspect, the present application provides a multilayer sheet including a metal layer, a bonding layer arranged on a first surface of the metal layer, and a buffer layer arranged on a second surface of the metal layer, wherein the buffer layer is provided with a hole.

According to an embodiment of the present application, the hole is provided with gas therein.

According to an embodiment of the present application, the gas includes an inert gas, nitrogen or carbon dioxide.

According to an embodiment of the present application, the hole includes one or more of a through hole, a blind hole and a buried hole.

According to an embodiment of the present application, a material of the buffer layer includes a polymer compound, and the polymer compound includes one or more of nylon, polypropylene, and polyethylene terephthalate.

According to an embodiment of the present application, in a thickness direction of the buffer layer, a ratio of a hole diameter of the hole to a thickness of the buffer layer is greater than or equal to 10% and less than or equal to 80%.

According to an embodiment of the present application, in the thickness direction of the buffer layer, the ratio of the hole diameter of the hole to the thickness of the buffer layer is greater than or equal to 20% and less than or equal to 50%.

According to an embodiment of the present application, the buffer layer is made of a magnesium alloy, an aluminum alloy, rigid foam or a sponge.

According to an embodiment of the present application, a shape of the hole includes one or more of a column shape, a honeycomb shape and a spherical shape.

According to an embodiment of the present application, the buffer layer has a thickness of greater than or equal to 10 microns and less than or equal to 100 microns.

According to an embodiment of the present application, the buffer layer has a thickness of greater than or equal to 30 microns and less than or equal to 50 microns.

In another aspect, the present application further provides a battery including an electrode assembly, and a packaging bag prepared from the multilayer sheet of any of above embodiments, wherein the packaging bag packages the electrode assembly.

According to an embodiment of the present application, the bonding layer is closer to the electrode assembly than the buffer layer.

The beneficial technical effects of the present application are as follows:

In the present application, the multilayer sheet including a metal layer, a bonding layer and a buffer layer is provided; the multilayer sheet can replaces the existing sheet. The buffer layer included in the multilayer sheet will greatly enhance the vibration resistance of the sheet. In particular, the arrangement of the holes of the buffer layer may enhance the absorption capacity of the buffer layer against the shock wave, and effectively reduces the damage caused by the vibration.

DETAILED DESCRIPTION

Figure 1:
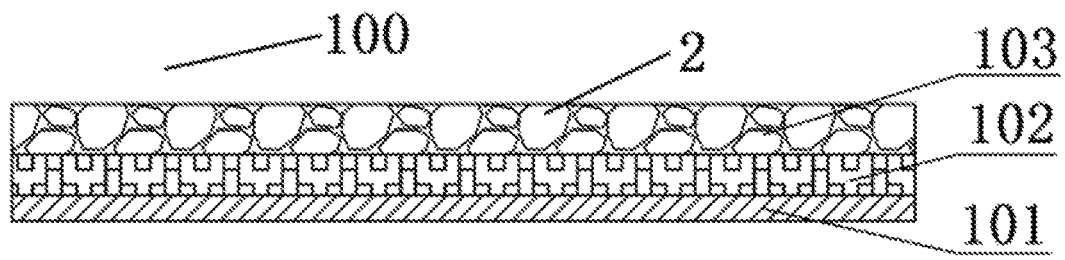
FIG. 1 is a schematic view of a multilayer sheet of an embodiment of the present application.

The various embodiments of the present application are set forth in the following detailed description, taken in conjunction with the accompanying drawings. It should be understood that the description of the application below with reference to the accompanying drawings is merely illustrative and not restrictive. The various embodiments may be combined with one another to form other embodiments not shown in the following description. In addition, the various orientation terms used in the following description are also merely illustrative and are not intended to limit the present application.

According to an embodiment of the present application, as shown in FIGS. 1 to 8, the embodiment of the present application in one aspect provides a multilayer sheet 100. The multilayer sheet 100 includes a bonding layer 101, a metal layer 102 and a buffer layer 103. Among them, the bonding layer 101 is arranged on a first surface of the metal layer 102, and the buffer layer 103 is arranged on a second surface of the metal layer 102. That is, the bonding layer 101, the metal layer 102 and the buffer layer 103 are sequentially arranged, and the metal layer 102 is located between the bonding layer 101 and the buffer layer 103. Further, the buffer layer 103 is provided with a hole therein.

In the present embodiment, the bonding layer 101 is still bondable after melted by heat. And, after the bonding layer 101 is again melted by heat, it is still rebondable. Further, the bonding layer 101 may be placed on a device that requires protection. Of course, the bonding layer 101 may be made of a corrosion-resistant material to prevent corrosion and damage. For example, the bonding layer 101 may be arranged on a surface of an electrode assembly 4. Therefore, when the electrolyte leaks, on one hand, the bonding layer 101 may be prevented from being corroded, on the other hand, the electrolyte leakage may be isolated to avoid more damage. The metal layer 102 may be an aluminum plastic film soft packaging structure or other material having good sealing properties for isolating external air, moisture, etc.

According to an embodiment of the present application, the hole of the buffer layer 103 is provided with gas therein. In the present embodiment, the buffer layer 103 is configured to be a structure similar to an air cushion structure, which is excellent in elasticity. The buffer layer 103 may effectively reduce the vibration of the device to be protected when impacted by other objects or the buffer layer 103 itself falling to the ground. In an alternative embodiment, liquids including non-conductive liquids may be disposed in the hole. As long as it may help the buffer layer 103 to absorb shock. Moreover, in several embodiments, the preparation method of the buffer layer 103 includes the steps of: manufacturing a gas cavity hole in the preparation process of the matrix material by a process such as foaming, and injecting a buffer gas. For example, injecting nitrogen or carbon dioxide or an inert gas into the molten matrix material, the bubble size and shape can be controlled by controlling the gas flow rate, to finally obtain the desired gas hole-containing layered material in the sizing stage. The matrix material may be PET, PI or a resinous material.

In an embodiment of the present application, the gas in the hole of the buffer layer 103 includes an inert gas, nitrogen or carbon dioxide. That is, the gas in the hole may conclude one or more types of gas. Of course, other gases may be used or considered to be arranged in the holes, as long as they are chemically stable, do not cause corrosion to the multilayer sheet 100, and do not harm to human health.

In an embodiment of the present application, the hole includes one or more of a through hole, a blind hole and a buried hole. That is, as long as the hole is provided to reduce the damage caused by the vibration, the type of the hole may be variously designed.

In an embodiment of the present application, the material of the buffer layer 103 includes a polymer compound. Of course, in an alternative embodiment, the polymer compound material may be a corrosion resistant material, a material having good toughness, and a material having high strength and being not easily cracked.

In an embodiment of the present application, the polymer compound mentioned above includes one or more of nylon, polypropylene and polyethylene terephthalate. Of course, the polymer material may also include other materials as long as they help to reduce the vibration damage.

In an embodiment of the present application, in a thickness direction of the buffer layer 103, a ratio of a hole diameter of the hole to a thickness of the buffer layer 103 is greater than or equal to 10% and less than or equal to 80%. With this ratio designed, the buffer layer 103 is reduced.

In an embodiment of the present application, in the thickness direction of the buffer layer 103, the ratio of the hole diameter of the hole to the thickness of the buffer layer 103 is greater than or equal to 20% and less than or equal to 50%. With this ratio designed, the vibration damage of the buffer layer 103 is reduced.

In an embodiment of the present application, the buffer layer 103 is made of a magnesium alloy, an aluminum alloy, rigid foam or a sponge. Since the magnesium alloy, the aluminum alloy and the rigid foam have certain hardness and a light weight, the buffer layer 103 made of such materials is advantageous for providing a porous structure. In addition, due to the plenty of porous, the sponge material is also a good porous material. To make the buffer layer 103 as a porous structure, that is, the porous structure layer 104, is also very useful for absorbing shock waves and effectively reducing vibration damage. In other alternative embodiments, the buffer layer 103 may select other absorbing materials as long as they help absorb shock.

In an embodiment of the present application, a shape of the hole of the porous structure layer 104 includes one or more of a column shape, a honeycomb shape and a spherical shape. This regular shaped hole helps the buffer layer 103 absorbing shock waves and reducing the damage of vibration. Of course, the shape of the hole may also be selected from other shapes, such as a cube, a truncated cone, a cone, and the like. Even in an alternative embodiment, the hole may be constructed in an irregular shape. Similarly, as long as the shape of the hole helps absorb shock.

In an embodiment of the present application, the buffer layer 103 has a thickness of greater than or equal to 10 microns and less than or equal to 100 microns. In various alternative embodiments, the thickness of the buffer layer 103 may be optimized in the range of 10-100 microns as described above.

In an embodiment of the present application, the buffer layer 103 has a thickness of greater than or equal to 30 microns and less than or equal to 50 microns. In various alternative embodiments, the thickness of the buffer layer 103 may be optimized in the range of 30-50 microns as described above.

In an embodiment of the present application, the buffer layer 103 has a thickness of 30 microns. The multilayer sheet 100 having the buffer layer 103 of this thickness is thin and flexible and may be applied to many fields where the space provided is limited.

In another aspect, an embodiment of the present application provides a battery including an electrode assembly 4, and a packaging bag prepared from the multilayer sheet 100 mentioned above, wherein the packaging bag packages the electrode assembly 4. That is, the multilayer sheet 100 is constructed as a packaging bag, and packages the electrode assembly 4 inside the packaging bag. At this time, the electrode assembly located in the packaging bag may not suffer great vibration caused by external impact.

In an embodiment of the present application, the bonding layer 101 is closer to the electrode assembly 4 than the buffer layer 103. That is, the bonding layer 101 is close to a surface of the electrode assembly 4, with the buffer layer 103 being the outermost layer. When the battery falls or is impacted by other objects, the outermost buffer layer 103 may reduce the damage of the vibration in time. Among which, it should be noted that the bonding layer 101 is not bonded to the surface of the electrode assembly 4, and it is heated to fuse the opposite two bonding layers at predetermined places required by packaging after the multilayer sheet 100 wraps the electrode assembly 4.

The embodiments of the present application will be described in detail taken in conjunction with the accompanying drawings.

As can be seen from FIG. 1, in an embodiment of the present application, the multilayer sheet 100 includes a bonding layer 101, a metal layer 102, and a buffer layer 103 which are sequentially arranged. Among them, the buffer layer 103 is constructed as a laminated structure including a plurality of small holes 2.

Figure 2:
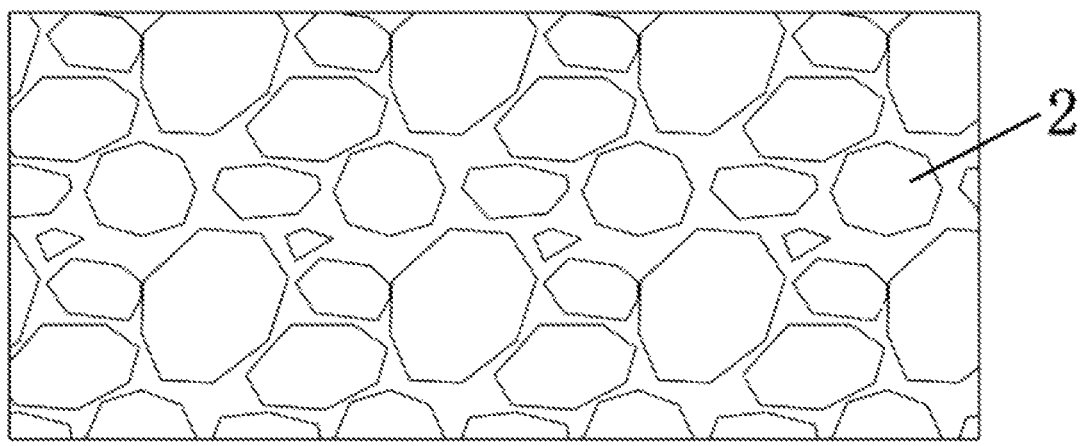
FIG. 2 is a schematic top view of the multilayer sheet of FIG. 1.

As can be seen from FIG. 2, in the present embodiment, the small holes 2 are constructed as irregular polygons. Additionally, in other alternative embodiments, the small hole 2 may be a cylindrical hole. And the small hole 2 may be one or more of a through hole, a blind hole or a buried hole.

Figure 3:
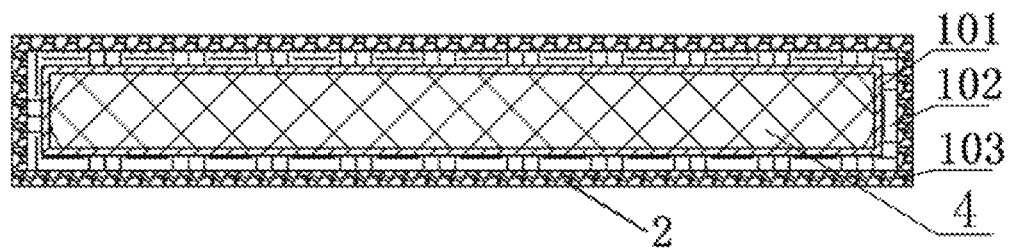
FIG. 3 is a schematic view of packaging the electrode assembly with the packaging bag constructed by the multilayer sheet of FIG. 1.

As shown in FIG. 3, the multilayer sheet 100 shown in FIG. 1 is constructed as a packaging bag for packaging the electrode assembly 4. The bonding layer 101 is bonded to the surface of the electrode assembly 4, and the buffer layer 103 is the outermost layer. After packaging, the multilayer sheet 100 is attached to the electrode assembly 4. When the electrode assembly 4 is subjected to vibration, the impact of shock and falling may be better reduced, and then the electrode assembly 4 is better protected.

Figure 4:
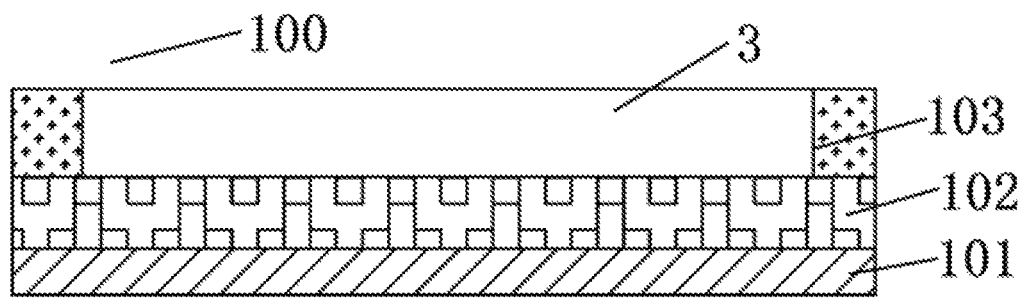
FIG. 4 is a schematic view of a multilayer sheet of another embodiment of the present application.

As can be seen from FIG. 4, in another embodiment of the present application, the buffer layer 103 is constructed as a laminated structure including large holes 3.

Figure 5:
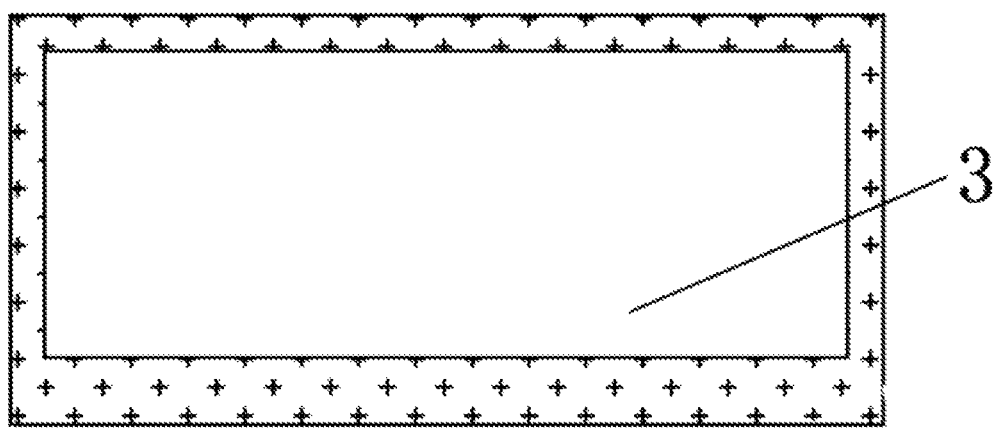
FIG. 5 is a schematic top view of the multilayer sheet of FIG. 4.

As can be seen from FIG. 5, in the present embodiment, the buffer layer 103 is provided with only one large hole 3. The advantage of providing a single large hole in the buffer layer 103 includes relatively simple manufacturing as well as buffer function. Of course, in other embodiments, there may be two to three large holes 3 provided.

Figure 6:
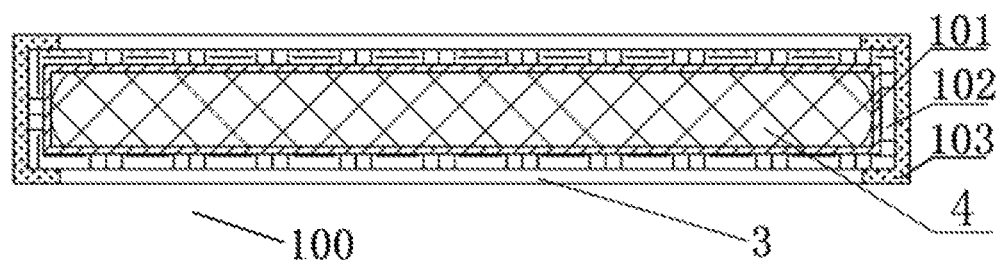
FIG. 6 is a schematic view of packaging the electrode assembly with the packaging bag constructed by the multilayer sheet of FIG. 4.

As can be seen from FIG. 6, the multilayer sheet 100 shown in FIG. 4 is constructed as a packaging bag that packages the electrode assembly 4. In this embodiment, the length and width of the large hole 3 are greater than or equal to the length and width of the packaged electrode assembly 4. Similarly, the bonding layer 101 is close to the surface of the electrode assembly 4.

Figure 7:
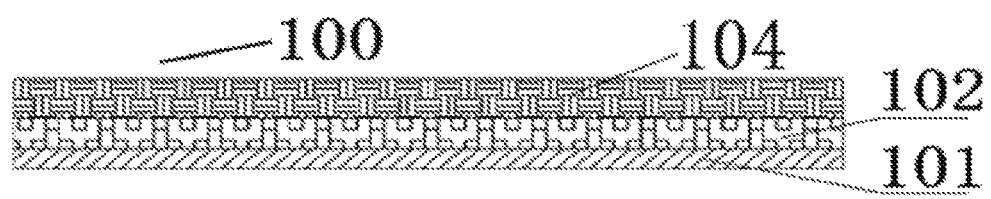
FIG. 7 is a schematic view of a multilayer sheet of still another embodiment of the present application.
Figure 8:
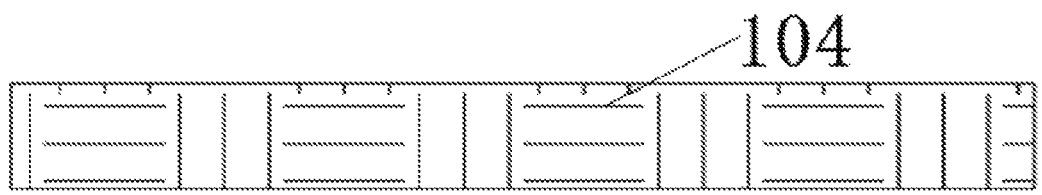
FIG. 8 is a partially enlarged view showing the buffer layer of the multilayer sheet of FIG. 7.

As can be seen from FIG. 7, the buffer layer 103 is configured as a porous structure layer 104. And as shown in FIG. 8, the columnar holes are evenly arranged, both in a horizontal direction and a vertical direction. Of course, in other alternative embodiments, the shape of the columnar holes are not limited, and may be a cylinder, a prism, a pyramid, etc.; and the columnar holes may be evenly arranged at a certain inclination angle or may be unevenly arranged. And the size of the columnar holes and the spacing of adjacent holes may be different. That is, the porous structure may be subjected to various optimization designs.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the present application are intended to be included within the scope of the present application.

What is claimed is:

1. A battery packaging bag made from a multilayer sheet for housing an electrode assembly, the multilayer sheet comprising:
   a metal layer;
   a bonding layer completely covering a first surface of the metal layer; and,
   a buffer layer completely covering a second surface of the metal layer;
   wherein the buffer layer is provided with porous structure.

2. The battery packaging bag according to claim 1, wherein each hole of the porous structure is provided with gas therein.

3. The battery packaging bag according to claim 2, wherein the gas comprises an inert gas, nitrogen or carbon dioxide.

4. The battery packaging bag according to claim 2, wherein the porous structure comprises one or more of a through hole, a blind hole and a buried hole.

5. The battery packaging bag according to claim 1, wherein a material of the buffer layer comprises a polymer compound, and the polymer compound comprises one or more of nylon, polypropylene and polyethylene terephthalate.

6. The battery packaging bag according to claim 1, wherein in a thickness direction of the buffer layer, a ratio of a hole diameter of the hole to a thickness of the buffer layer is greater than or equal to 10% and less than or equal to 80%.

7. The battery packaging bag according to claim 6, wherein the ratio is greater than or equal to 20% and less than or equal to 50%.

8. The battery packaging bag according to claim 1, wherein the buffer layer is made of a magnesium alloy, an aluminum alloy, rigid foam, or a sponge.

9. The battery packaging bag according to claim 1, wherein a shape of each hole of the porous material comprises one or more of a column shape, a honeycomb shape and a spherical shape.

10. The battery packaging bag according to claim 1, wherein the buffer layer has a thickness of greater than or equal to 10 microns and less than or equal to 100 microns.

11. The battery packaging bag according to claim 10, wherein the buffer layer has a thickness of greater than or equal to 30 microns and less than or equal to 50 microns.

12. A battery, comprising:
    an electrode assembly;
    a packaging bag prepared from a multilayer sheet;
    wherein the packaging bag packages the electrode assembly, and the multilayer sheet comprises:
    a metal layer;
    a bonding layer completely covering a first surface of the metal layer; and,
    a buffer layer completely covering a second surface of the metal layer;
    wherein the buffer layer is provided with porous structure.

13. The battery according to claim 12, wherein the bonding layer is closer to the electrode assembly than the buffer layer.

14. The battery according to claim 12, wherein each hole of the porous structure is provided with gas therein.

15. The battery according to claim 14, wherein the gas comprises an inert gas, nitrogen or carbon dioxide.

16. The battery according to claim 12, wherein the porous structure comprises one or more of a through hole, a blind hole, and a buried hole.

17. The battery according to claim 12, wherein a material of the buffer layer comprises a polymer compound, and the polymer compound comprises one or more of nylon, polypropylene and polyethylene terephthalate.

18. The battery according to claim 12, wherein in a thickness direction of the buffer layer, a ratio of a hole diameter of the hole to a thickness of the buffer layer is greater than or equal to 10% and less than or equal to 80%.

19. The battery according to claim 12, wherein the buffer layer is made of a magnesium alloy, an aluminum alloy, rigid foam, or a sponge.

20. The battery according to claim 12, wherein the buffer layer has a thickness of greater than or equal to 10 microns and less than or equal to 100 microns.

\* \* \* \* \*